(12) United States Patent
Takahashi

(10) Patent No.: US 6,187,410 B1
(45) Date of Patent: Feb. 13, 2001

(54) MOLDED PRODUCT

(75) Inventor: Toshiharu Takahashi, Shizuoka (JP)

(73) Assignee: Yazaki Corporation, Tokyo (JP)

( * ) Notice: Under 35 U.S.C. 154(b), the term of this patent shall be extended for 0 days.

(21) Appl. No.: 09/073,767

(22) Filed: May 7, 1998

(30) Foreign Application Priority Data

May 8, 1997 (JP) .................................................. 9-118422
Apr. 7, 1998 (JP) .................................................. 10-094912

(51) Int. Cl.⁷ ...................................................... B32B 3/06
(52) U.S. Cl. ............................. 428/99; 428/212; 428/432
(58) Field of Search .................................. 428/212, 433, 428/411.1, 432, 901, 100, 99

(56) References Cited

U.S. PATENT DOCUMENTS 3,597,663 * 8/1971 Markarian ............................ 317/230
3,978,378 * 8/1976 Tigner et al. ......................... 317/258

* cited by examiner

Primary Examiner—Merrick Dixon
(74) Attorney, Agent, or Firm—Sughrue, Mion, Zinn, Macpeak & Seas, PLLC

(57) ABSTRACT

A molded product contains a primary molded product and a molded product main body that is formed through secondary resin molding to the primary molded product so that primary mold surfaces of the primary molded product are disposed inside of secondary mold surfaces of the molded product main body. In the molded product, the connector component including a plurality of terminals is utilized as the primary molded product. The primary mold surfaces of the connector component where the terminals protrude are disposed inside the secondary mold surfaces in the socket parts on the front and rear sides of the molded product main body.

4 Claims, 7 Drawing Sheets

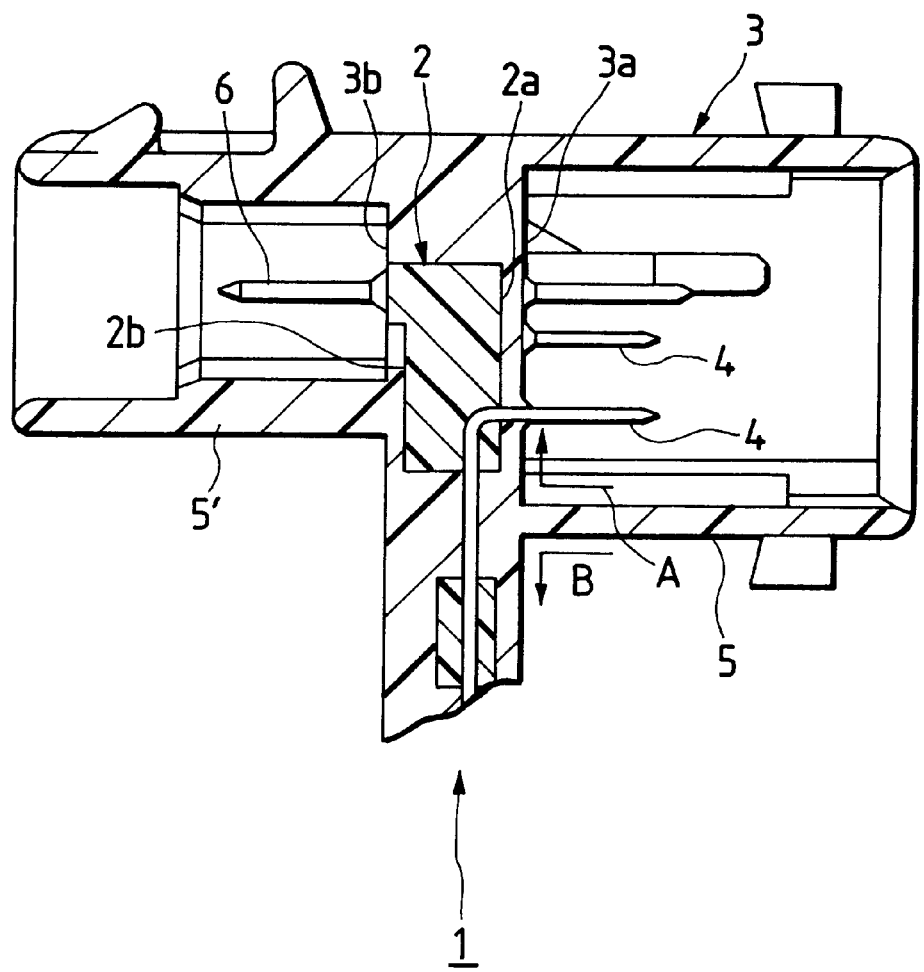

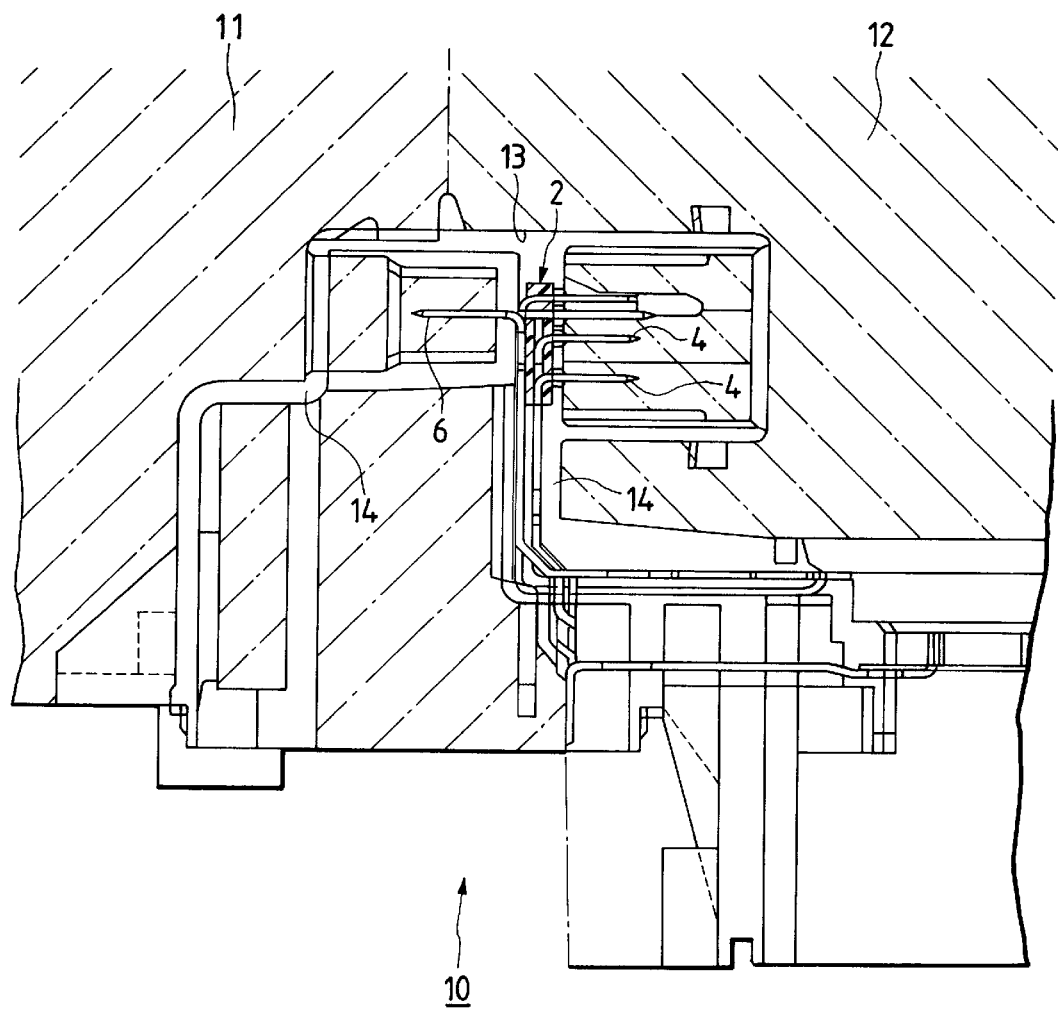

MOLDED PRODUCT

BACKGROUND OF THE INVENTION

1. Field of the Invention

This invention relates to a molded product which is produced through secondary molding (e.g. injection molding) to a primary molded product, and specifically relates to a shape of a molded product wherein a fluid balance of molten resin is considered at the time of the secondary molding.

2. Background

A molded product of this kind is shown in FIGS. 8 and 9b. FIGS. 8 and 9b show a connector 1' as a molded product. The connector 1' includes a connector component 2 as a primary molded product which is shown in FIGS. 8 and 9a, and a molded product main body 3' which is formed through secondary molding of molten resin with the connector component 2.

The connector component 2 is utilized in order to fix pitches of a plurality of terminals 4 which are formed by insert molding into the connector component 2, and also utilized for improvement in operational efficiency at secondary molding of the molded product main body 3'. In the case where the connector 1' is secondarily molded by using the connector component 2, the connector component 2 is placed inside the cavity of an injection molding die (not shown) so that a primary mold surface 2a where the terminals 4 of the connector component 2 protrude will be made flush with a secondary mold surface 3a inside a socket part 5 (an opening for fitting a mating connector) of the molded product main body 3' after the secondary molding. Then, molten resin is injected into the cavity of the injection molding die to form the connector 1' through the secondary molding.

In the conventional connector 1', however, since the connector component 2 is placed approximately at the vertical center of the cavity of the injection molding die at the time of the secondary molding (that is, the connector component 2 is placed inside the cavity of the injection molding die at the approximate center thereof so that the primary mold surface 2a where the terminals 4 of the connector component 2 protrude will be made flush with the secondary mold surface 3a inside the socket part 5 of the molded product main body 3' after molding), the flow amount (X') of the molten resin, which flows inside the cavity for forming the molded product main body 3' along the lower side B, is extremely larger than the flow amount (Y') of the molten resin which flows inside the cavity along the upper side A. That is, the relation between the flow amount (X') and the flow amount (Y') is:

$$X' > Y'.$$

Accordingly, as indicated by C in FIG. 9b, there is a possibility that the opening of the socket part 5 of the molded product main body 3' is downwardly drawn at the time of the secondary molding so that the opening of the socket part 5 is deformed in a curved manner.

Furthermore, since the connector component 2 which is placed inside the cavity blocks the resin flow, a short shot is liable to occur from shortage in the amount of resin flowing to the socket 5 side.

SUMMARY OF THE INVENTION

It is an object of the invention to solve the above problems and to provide, at a low-cost, a highly-accurate molded product in which deformation of the molded product main body, which is liable to be generated at the time of the secondary molding, is surely prevented, and also occurrence of short shots is prevented.

According to the first aspect of the invention, there is provided a molded product which comprises a primary molded product; and a molded product main body formed through secondarily molding to the primary molded product so that primary mold surfaces of the primary molded product are disposed inside secondary mold surfaces of the molded product main body.

In the molded product, since resin is entirely molded and evenly over the primary molded product at the second molding, short shots and deformation in the molded product main body can not occur.

According to the second aspect of the invention, the primary molded product is a connector component comprising a plurality of terminals, the primary mold surfaces where the terminals protrude are disposed inside the secondary mold surfaces of the molded product main body.

This molded product enables provision of highly-accurate connectors at a low-cost.

According to the third aspect of the invention, the primary molded product is a connector component comprising a supporting wall part and a plurality of terminals protrude from the supporting wall part, the molded product main body comprises a socket part in which the terminals are provided, the supporting wall part has a through hole, for allowing molten resin to flow into the socket part during the secondary molding, formed in the supporting wall part at a position confronting a part of the socket part.

In this molded product, since a sufficient amount of resin flows into the cavity for formation of the socket part through the through hole which is formed in the primary molded product, occurrence of short shots is prevented.

According to the fourth aspect of the invention, the through hole opens wider on a downstream side than on an upstream side of resin flow, with the socket part as a border during the secondary molding.

In this molded product, since resin sufficiently flows thoroughly to the downstream side of the socket part, sufficient thickness of the socket part can be ensured and toughness of the socket part can be enhanced.

According to the fifth aspect of the invention, the socket part is an opening in which a mating connector is fittable.

In the molded product, the socket part is reinforced.

BRIEF DESCRIPTION OF THE DRAWINGS

FIG. 1 is a cross-sectional view showing a molded product of a first embodiment of the present invention;

FIG. 3 is a cross-sectional view showing a principal part in injection molding dies which are used for the secondary molding;

DETAILED DESCRIPTION OF THE PREFERRED EMBODIMENTS

First Embodiment

A first embodiment of the present invention will now be described with reference to FIGS. 1 to 4.

Figure 2A:
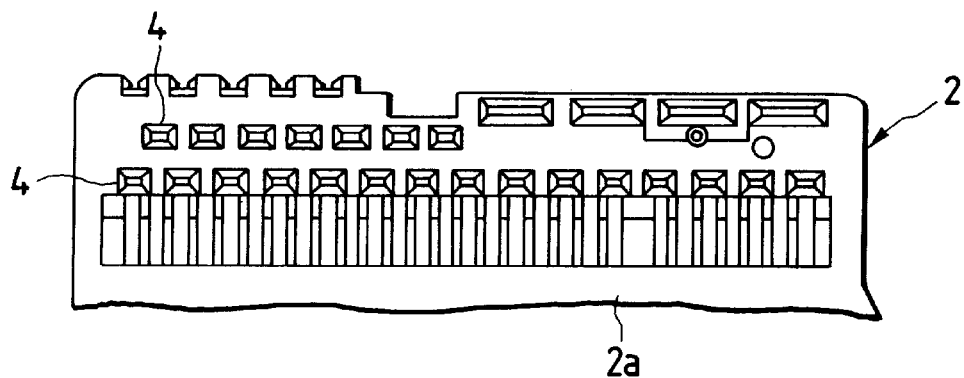
FIG. 2a is a front view of the primary molded product which is used for the secondary molding.
Figure 2B:
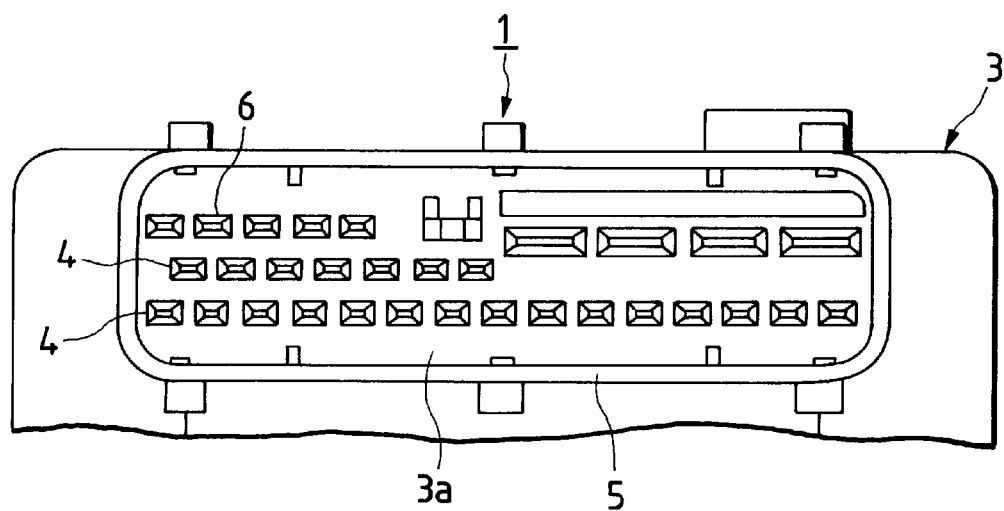
FIG. 2b is a front view of the same molded product.
Figure 4:
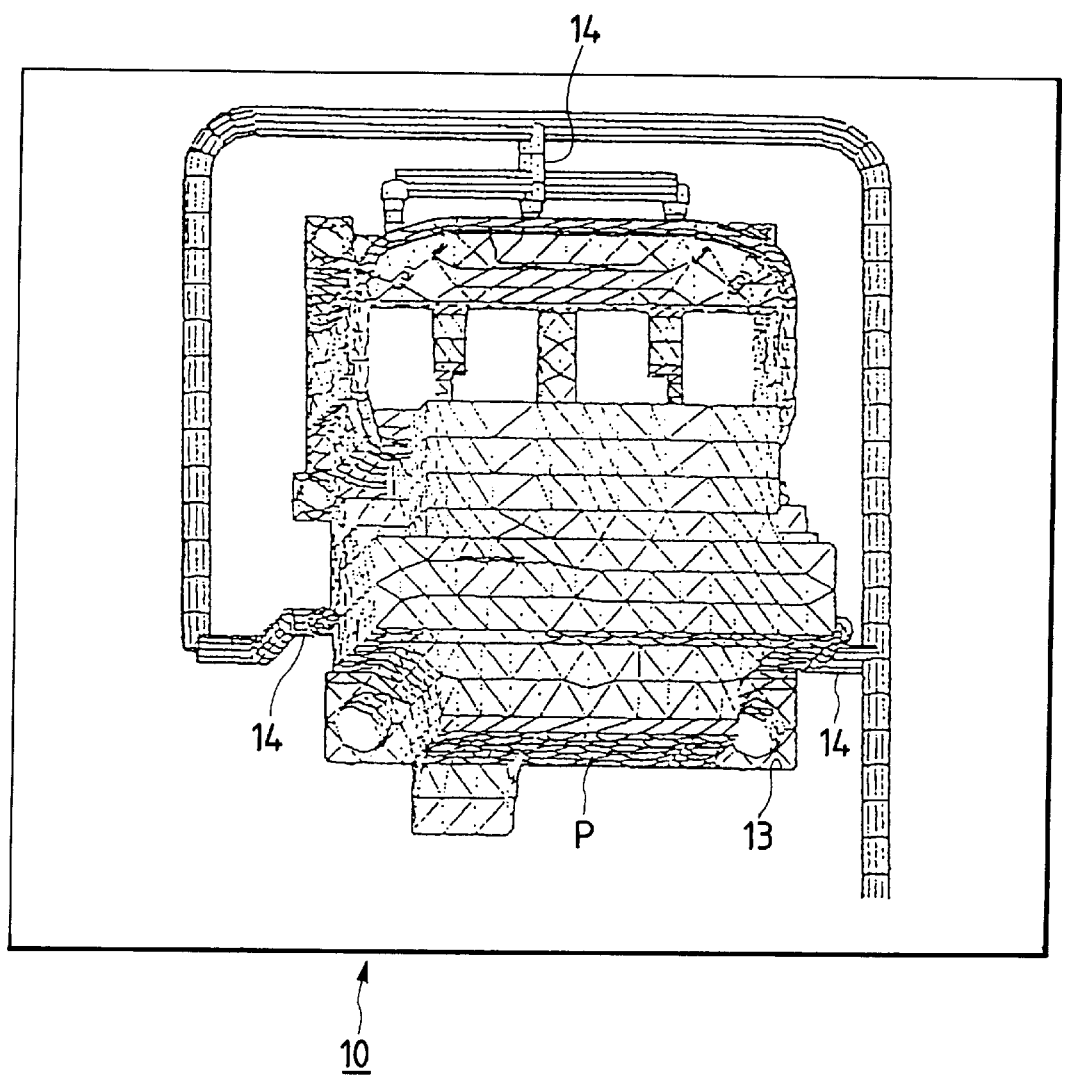
FIG. 4 is an illustrative view showing locations of gates of the above-described injection molding die.

As shown in FIGS. 1 and 2b, a connector 1, which is a molded product, comprises a connector component 2 as a primary molded product shown in FIGS. 1 and 2a and a molded product main body 3 which is formed by secondarily molding molten resin P (see FIG. 4) to the connector component 2.

The connector component (the primary molded product) 2 is utilized in order to fix pitches of terminals 4 and 6 which are mounted in the connector component 2 by insert molding, and also utilized for improvement in operational efficiency at secondary molding for forming the molded product main body 3. In the case where the connector component 2 is secondarily molded to form the connector (molded product) 1, the connector component 2 is placed inside the cavity 13 which is formed between a movable metal die 11 and a fixed metal die 12 of injection molding dies 10 so that a primary mold surface 2a, which becomes a window part of the connector component 2, where a plurality of terminals 4 of the connector component 2 protrude, and another primary mold surface 2b where the terminals 6 protrude, will be placed respectively inside secondary mold surfaces 3a and 3b located inside socket parts 5 and 5' which are on the front and rear sides of the molded product main body 3 after the secondary molding. Then, molten resin P is injected into the cavity 13 through one of gates 14 substantially located at a center position of the cavity 13, so as to form the connector 1. That is, a boundary portion between the socket parts 5 and 5' on the front and rear sides of the molded product main body 3 is thicker than the connector component 2, and further, the connector component 2 is disposed between the secondary mold surfaces 3a and 3b which are formed at the boundary portion between the socket parts 5 and 5'.

The secondary molding for forming the above described connector 1 by using the injection molding dies 10 will now be described next with reference to FIG. 3. First, the connector component 2, which has a plurality of the terminals 6 and 4 which are arranged in parallel with each other and extend through the upper end portion, the approximate center portion and the lower portion of the connector component 2, is set in the cavity 13 of the injection molding dies 10 so that the terminals 4 at the center portion of the connector component 2 will be positioned at the inside center of the socket part 5 of the molded product main body 3. At this time, the connector component 2 is set in the cavity 13 through the terminals 4 and 6 or the like so that predetermined spaces are formed between the connector component 2 and the cavity 13 on the side of the movable metal die 11 as well as the cavity 13 on the side of the fixed metal die 12. Then, the molten resin P is injected into the cavity 13 through one of the gates 14 located approximately at the center of the cavity 13. In accordance with the injection into the cavity 13 for forming the molded product main body 3, as shown in FIG. 1, the flow amount (Y) of the molten resin P flowing inside the cavity 13 along the upper side A is approximately equal to the flow amount (X) of the molten resin P which flows inside the cavity 13 along the lower side B. That is, the relation between the flow amount (X) and the flow amount (Y) is:

$$X \approx Y.$$

Accordingly, as shown in FIG. 2b, the connector 1, in which the openings of the socket parts 5 and 5' on the front and rear sides of the molded product main body 3 are not downwardly drawn and are not deformed in the curved manner as the conventional connector 1', is obtained by the secondary molding. At the time of the secondary molding, even if the connector component 2 is positioned approximately at the vertical center of the cavity 13 of the injection molding dies 10, the favorable fluid balance of the molten resin P enables production of a low-cost but highly-accurate connector 1 in which pitch dimensions between the terminals 4 and 6 are highly accurate without any deformation and short shot because the molten resin P approximately uniformly flows along the upper and lower sides A and B through the spaces between the primary mold surfaces 2a and 2b of the connector component 2 and the cavity 13.

Second Embodiment

A second embodiment of the present invention will now be described with reference to FIGS. 5 to 6. For the purpose of correspondence, the same symbols are given to the same elements as in the first embodiment. The molded product in this embodiment is applied to a connector 20 in which the connector component 2 is the primary molded product.

Figure 5:
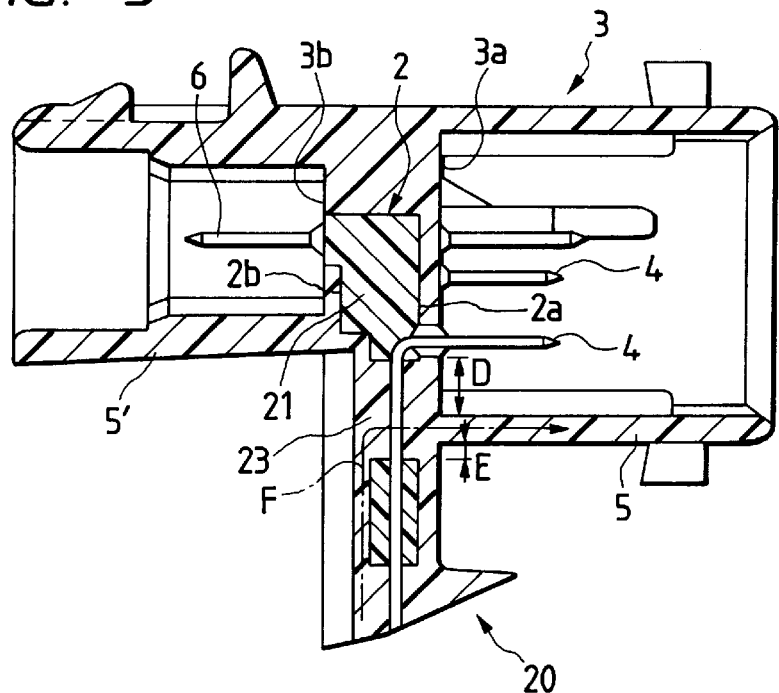
FIG. 5 is a sectional view showing a molded product of a second embodiment of the present invention.

As shown in FIG. 5, the connector component 2 comprises a plurality of terminals 4 which protrude from a primary mold surface 2a of a supporting wall part 21 which is a molded resin product while other terminals 6 protrude from the primary mold surface 2b on the other side. As shown in FIG. 6, the connector component 2 includes a structure in which the terminals 4 bent in an L shape are supported by the supporting wall part 21 and a retaining wall part 22 on both sides of the terminals 4 with a bent part 25 as the border thereof. The terminals 4 are exposed at the bent part 25 without resin molding.

In the supporting wall part 21 of the connector component 2, through holes 23 are formed so as to penetrate the wall part 21 in a thickness direction. As shown in FIG. 5, the through holes 23 are formed at the positions which confront a lower portion of the socket part 5 of the molded product main body 3 so as to allow the resin injected into the cavity 13 to flow to the socket part 5 through gates 14 at the time of the secondary molding.

The secondary molding in the second embodiment is carried out in the same manner as in the first embodiment, and the secondary molding is carried out in a state that the primary mold surfaces 2a and 2b of the connector component 2 are located inside the secondary mold surfaces 3a and 3b of the molded product main body 3, respectively. At this time of the secondary molding, the molten resin P is allowed to flow inwardly to the socket 5 side through the through holes 23 which are provided in the supporting wall 21 as indicated by a dashed-line arrow F in FIG. 5. Therefore, since the socket part 5 is formed with sufficient amount of the molten resin, occurrence of the short shots is prevented and molding can be carried out without any deformation.

In the second embodiment, as shown in FIG. 5, the connector component 2 is placed inside the cavity 13 so that the through holes 23 in the supporting wall part 21 open wider on the downstream side (the side away from the gates 14) than on the upstream side (the side of the gates 14 in FIG. 3) of the resin flow indicated by arrow F with the lower portion of the socket part 5 of the molded product main body 3 as the border thereof. That is, it is placed so that dimension D of the opening on the upstream side for the resin flow will be larger than dimension E of the opening on the downstream side (i.e. dimension E of the opening<dimension D of the opening). When the molten resin is injected into the cavity in this state of placement, the molten resin can flow thoroughly to the downstream side (the inner side) of the socket part 5. Therefore, sufficient thickness is ensured in the socket part 5 and thus toughness of the socket part 5 is enhanced. Therefore, deformation of the socket part 5 can be prevented, and smooth fitting operation at the time of fitting the socket part 5 to the mating connector is realized.

Figure 6:
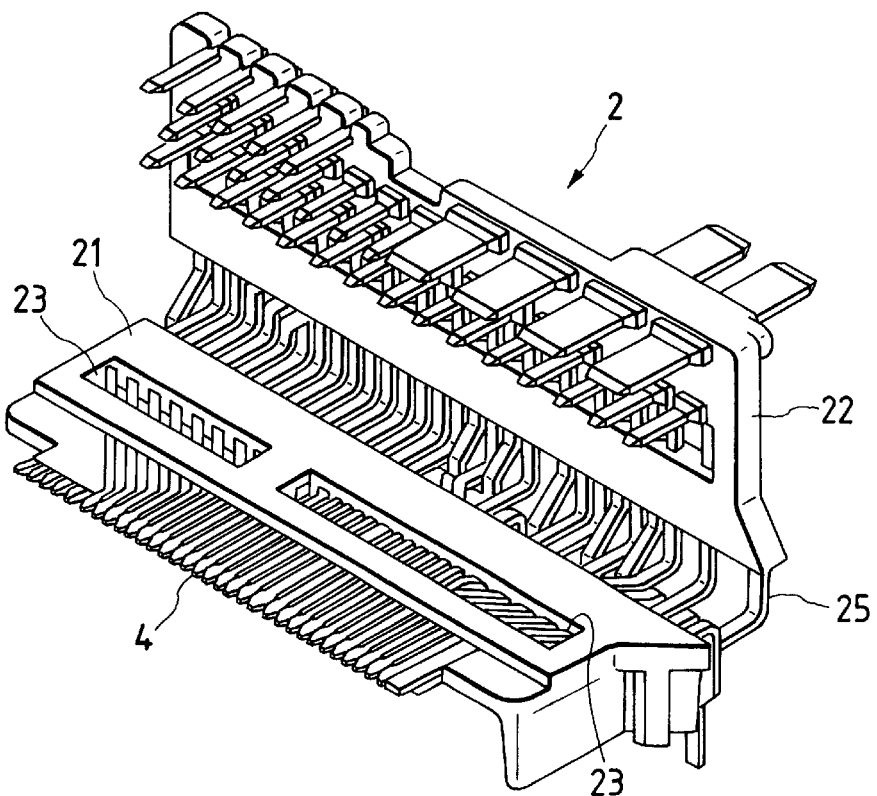
FIG. 6 is a perspective view showing a whole of the primary molded product which is utilized in the molded product shown in FIG. 5.
Figure 7:
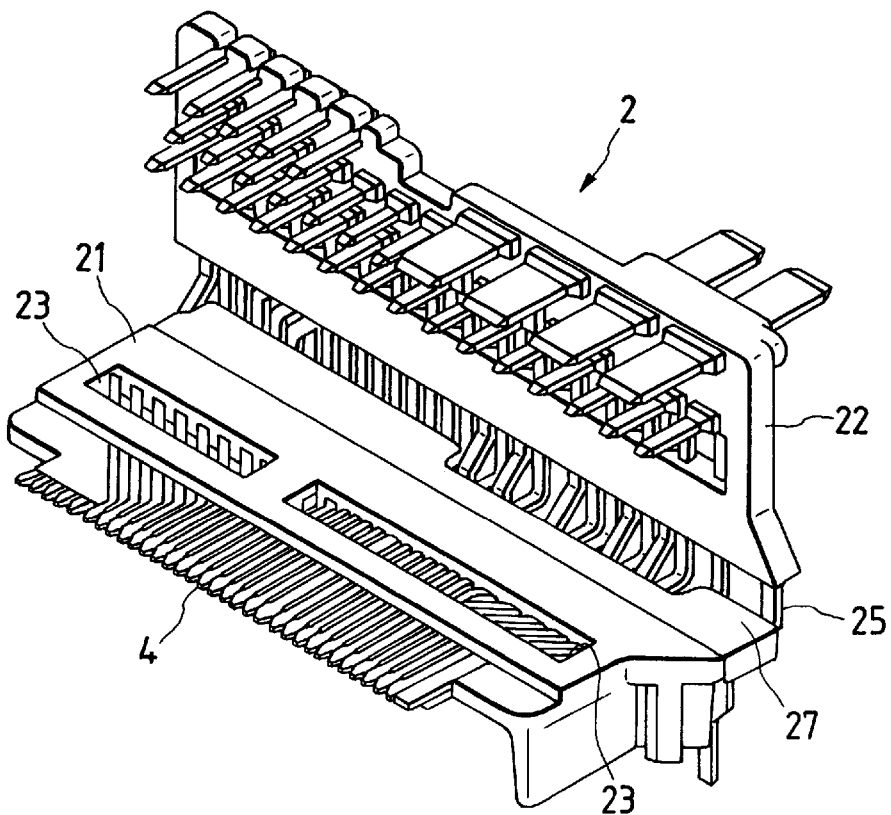
FIG. 7 is a perspective view showing a modified example of the primary molded product shown in FIG. 6.
Figure 8:
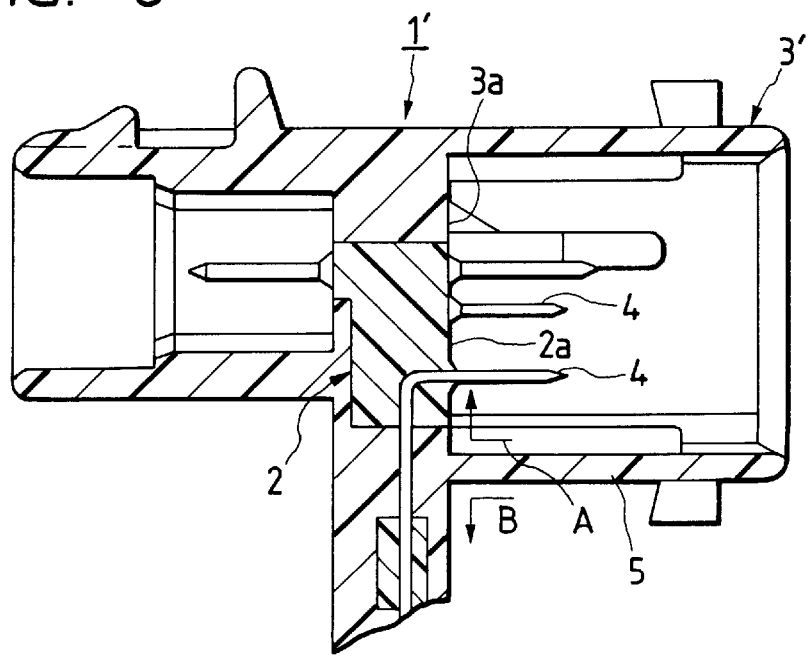
FIG. 8 is a sectional view showing a conventional molded product.
Figure 9A:
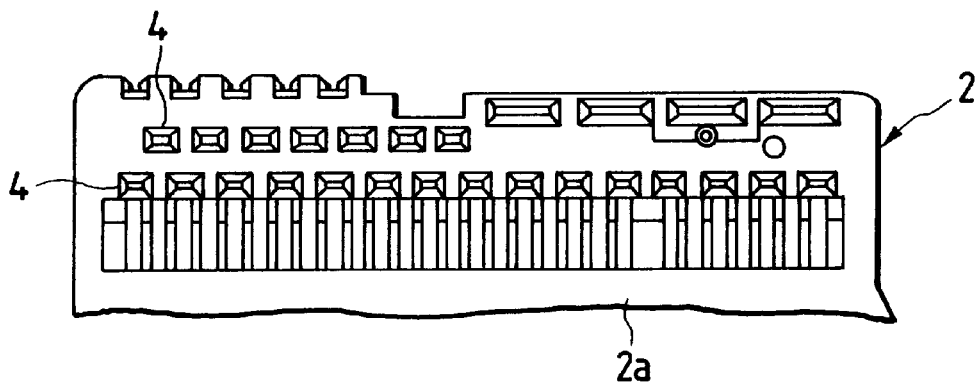
FIG. 9a is a front view of the primary molded product which is used for the molding of the conventional molded product.
Figure 9B:
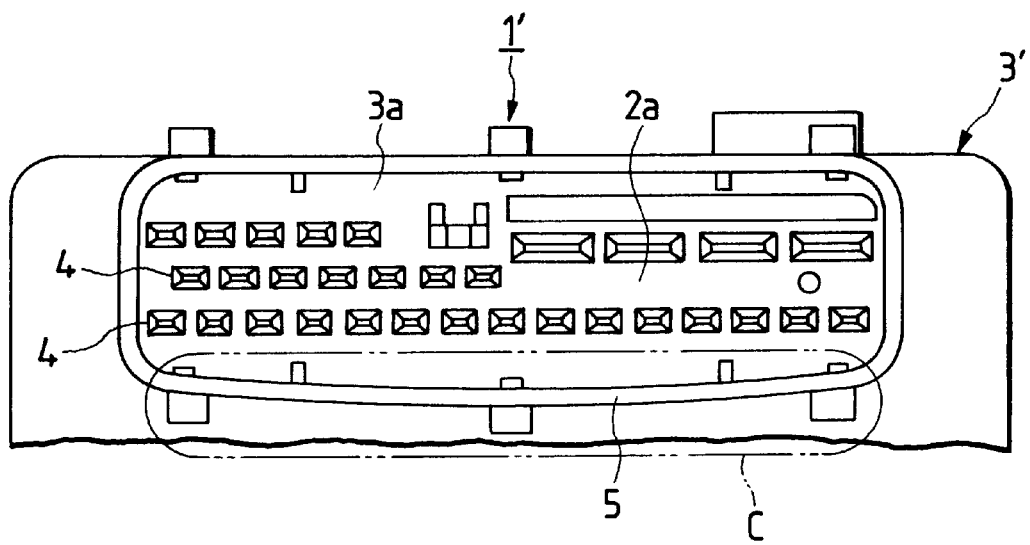
FIG. 9b is a front view of the conventional molded product.

FIG. 7 shows a modified example of the embodiment shown in FIGS. 5 and 6, a resin-plate spacer 27 is disposed at the bent part 25 of the exposed terminals 4. The second molding is carried out in the state that the spacer 27 is disposed as described above. Since the molten resin may flow excessively in a vicinity of the bent part 25 to cause thick resin in the vicinity of the bent part 25, the spacer 27 is provided for preventing the thick resin.

Although each of the embodiments described above is a case of injection molding of the connector, the above-described embodiments can be applied to other secondary molded products with metal die molding, such as injection blow molding and extrusion molding.

As described above, according to the first aspect of the invention, since resin is molded entirely and evenly over the primary molded product at the second molding, any deformation in the molded product main body is surely prevented at the secondary molding.

According to the second aspect of the invention, at a low-cost, highly-accurate connectors can be provided.

According to the third aspect of the invention, since the sufficient amount of resin flows through the through holes in the primary molded product into the socket part side of the molded product main body, short shots and deformations can be prevented.

According to the fourth aspect of the invention, since the sufficient amount of resin flows thoroughly to the downstream side of the socket part, the sufficient thickness of the socket part with higher toughness can be ensured.

According to the fifth aspect of the invention, the socket part is reinforced.

What is claimed is:

1. A connector, comprising:

a primary molded product having a plurality of terminals which protrude from primary mold surfaces of said primary molded product; and a connector main body formed through secondarily molding to the primary molded product, so that said primary mold surfaces are disposed inside a plurality of secondary mold surfaces of the connector main body.

2. The connector of claim 1, wherein the primary molded product is a connector component comprising a supporting wall part and a plurality of terminals which protrude from the supporting wall part, and wherein the connector main body comprises a socket part in which the terminals are provided, and the supporting wall part has a through hole formed at a position confronting a part of the socket part to allow molten resin to flow into said socket part during the secondary molding.

3. The connector of claim 2, wherein the through hole opens wider on a downstream side than on an upstream side of resin flow, with the socket part as a border during the secondary molding.

4. The connector of claim 2, wherein the socket part is an opening into which a mating connector is fittable.

* * * * *